J. A. CHARTER.
WHEEL HUB CONSTRUCTION.
APPLICATION FILED JULY 5, 1919.
1,363,838.
Patented Dec. 28, 1920.
2 SHEETS—SHEET 1.
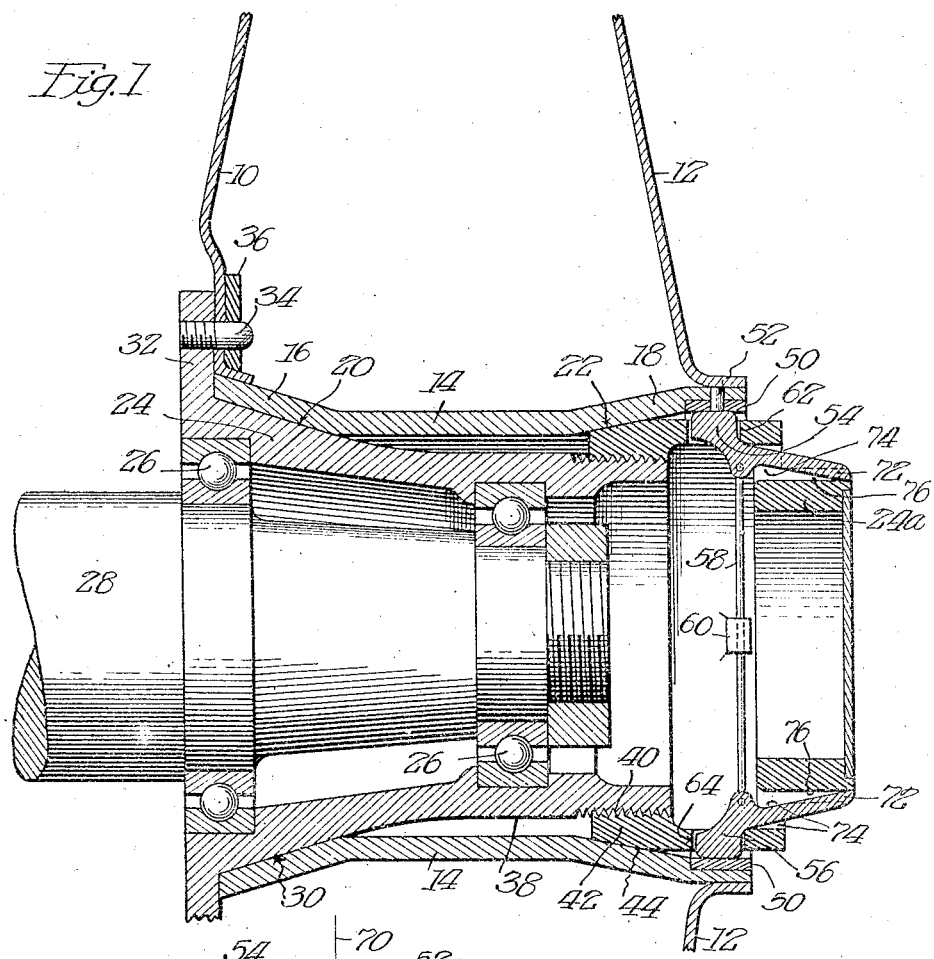
Inventor:
James A. Charter,
By Cheever & Cox
Attys.

J. A. CHARTER.
WHEEL HUB CONSTRUCTION.
APPLICATION FILED JULY 5, 1919.
1,363,838.
Patented Dec. 28, 1920.
2 SHEETS—SHEET 2.
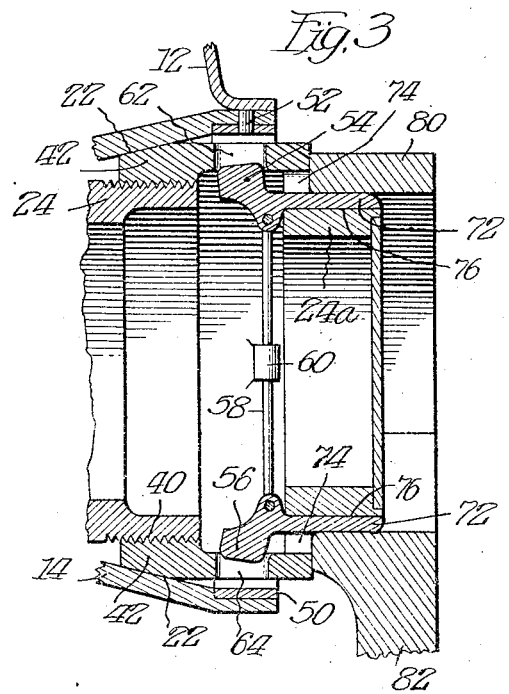
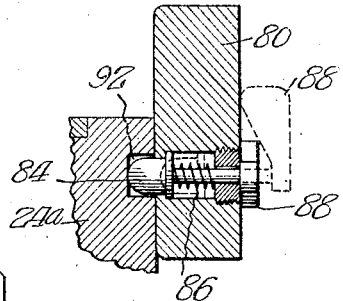
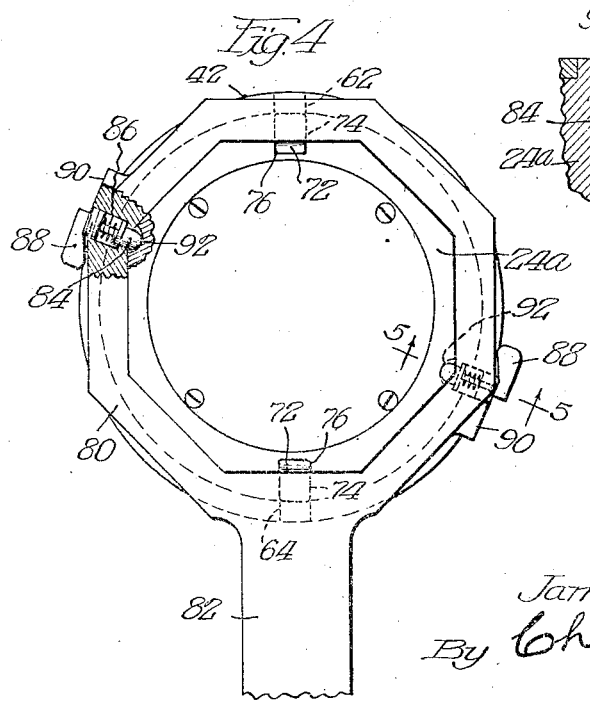
Inventor:
James A. Charter,
By Cheever & Cox
Attys.

UNITED STATES PATENT OFFICE.

JAMES A. CHARTER, OF CHICAGO, ILLINOIS.

WHEEL-HUB CONSTRUCTION.

1,363,838.	Specification of Letters Patent.	Patented Dec. 28, 1920.

Application filed July 5, 1919. Serial No. 308,862.

*To all whom it may concern:*

Be it known that I, JAMES A. CHARTER, a citizen of the United States, residing at Chicago, in the county of Cook and State of Illinois, have invented certain new and useful Improvements in Wheel-Hub Construction, of which the following is a specification.

This invention relates broadly to demountable wheels commonly used on automobiles and the like, for quickly changing wheels at the roadside when a tire gives out.

The invention is especially applicable to demountable wheels of the disk type, *i. e.*, in which the perforations between spokes are omitted.

The object of the invention is to provide a device of this class in which the inner portions of the disk or disks of the wheel proper may be provided with a simple machined hub portion which is very economical in construction and may then be applied to the inner or permanent hub commonly used on the standard automobile axles of the present time, and in which the wheel is held in rigidly locked condition on such inner hub by a nut mechanism which is readily insertible in place and is locked there by a very simple means readily controlled by the more or less inexperienced and untrained operator in the ordinary use of the automobile.

The invention consists in mechanism for carrying out the foregoing objects which can be easily and cheaply made, which is absolutely dependable, and therefore not readily liable to get out of order. Particularly the invention consists in features and details of construction hereafter more fully set forth in the specification and claims.

Referring to the drawings in which like numerals represent the same parts throughout the several views, Figure 1 is a vertical sectional detailed view through the center of mechanism illustrating this invention in its preferred form, showing the parts in the position which they assume when the wheel is on the automobile hub and locked there in fixed position.

Fig. 2 is an end view, certain parts being shown in broken section, taken from the right hand end of Fig. 1, the lower dog 56 being, however, shown in the position assumed when the dogs 54 and 56 are staggered with the teeth of ring 50 instead of when arranged so they both mesh as shown in Fig. 1.

Fig. 3 is a changed position view of the parts appearing at the right hand end of Fig. 1 showing in addition the wrench applied thereto and the locking dogs released ready for the removal of the nut.

Fig. 4 is an end view of the wrench mechanism of Fig. 3 and the parts contained within the wrench showing particularly a latch mechanism for detachably securing the wrench on the nut.

Fig. 5 is a sectional view on the line 5—5, Fig. 4, showing this latch mechanism.

For purposes of illustrating this invention, a conventional form of wheel proper is shown comprising two metallic disks 10 and 12, each secured by means forming no part of this invention to a plain machined hub 14 whose outer ends are inclined outwardly from the axis of the wheel in inclined portions 16 and 18, so as to form on the inner surface of the hub oppositively inclined bearing surfaces 20 and 22 clearly shown in Fig. 1.

The problem solved by this invention is the firm detachable mounting of this hub and consequently the wheel upon the inner hub 24 which is the modern standard commercial hub of the automobile trade. The particular hub 24 shown in the drawings happens to be one used on the front wheel of an automobile and is therefore shown as mounted on ball bearings 26 on the axle 28. The particular connection between this hub and the axle, whether ball bearing or rigid, as required when the construction is for a rear driving wheel, does not enter into the present invention and so the rigid rear wheel construction is not shown. In carrying out this invention the outer circumference of hub 24 whether for a rear or a front wheel, is made at its inner portion with an outwardly inclined surface 30 corresponding with and fitting upon surface 20 on the wheel hub 14, heretofore referred to. This inclined surface 30 terminates in a radial flange 32 from which project one or more pins 34 entering the disk 10 of the wheel. This disk 10 is preferably reinforced in some manner, as for instance by the reinforcing plate 36 secured thereto in any suitable position. In the particular case here illustrated the plate is welded on the inside of the disk 10.

The outer or smaller end of the hub 24 is cylindrical in form as shown at 38 and terminates in screw threads 40 engaged by corresponding screw threads on a lock nut 42. The inner outer portion of this nut 42 is provided with an angular face 44 corresponding to and fitting with face 22 on the hub. From an inspection of the drawings it will be seen that when nut 42 is forced to the left, as viewed in the drawings, angular face 44 will engage angular face 22 of hub 14, and thus first center the wheel and then force it back toward flange 32, and in so doing causing face 20 of the hub 14 to engage and travel up face 30 of hub 24.

In order to detachably lock nut 42 in the position just described with the wheel held rigidly on the hub 24, the following mechanism is provided: The inner surface of the outer end of hub 14 is provided, by any suitable means, with a roughened locking surface. In the particular case here illustrated this result is produced by inserting in the outer end of the hub a toothed ring 50 secured in suitable position by any suitable means such as pins or rivets 52, and the adjacent portion of the nut 42 is provided with suitable interengaging locking members which, in the particular case here illustrated, take the form of dogs 54 and 56 carried on opposite ends of a semi-circular spring 58, permanently secured on the inner surface of the nut at 60. These dogs 54 and 56 work through suitable slots 62 and 64, respectively, provided for the purpose of allowing them, when in the position of Fig. 1, to intermesh between properly positioned teeth on ring 50 while permitting them to be withdrawn in lines at right angles to the axis of the shaft to the position of Fig. 3 where they cease to so intermesh and thus leave the nut free to be rotated.

The two dogs 54 and 56 are preferably so placed circumferentially of the nut that, given a particular number and arrangement of teeth on ring 50, at least one dog will always be capable of meshing with one notch in ring 50; in other words, the dogs are preferably staggered with reference to the teeth of the ring. In the particular case here illustrated the dog at the upper end of line 70, Fig. 2, is in mesh while the one at the lower end of that line is out of mesh. If the dogs are released and the nut moved slightly, the lower dog will then mesh and the upper dog be out of mesh. Fig. 1, however, shows the dogs so placed that they both simultaneously mesh with the ring teeth.

Each one of these dogs 54 and 56 is provided with an extending tail piece or arm 72 projecting from the nut face through a separate hole 74 provided for it. These holes 74 are made of such a length radially of the nut that the dogs can move from the position of Fig. 1 to that of Fig. 3 and vice versa. The nut 42, heretofore described, is provided with an outwardly extending, smaller, noncircular, wrench engageable portion 24ª clearly shown in end view in Fig. 4. This portion 24ª is provided with suitable recesses 76 each adapted to receive and contain the end 72 of the adjacent dog. The dogs 54 and 56 are moved from extended position of Fig. 1 to withdrawn position of Fig. 3 by clamping a wrench 80 onto the outer surface of this end portion 24ª of the nut. When the wrench is placed as shown in Fig. 3, on the parts just described, the dogs are withdrawn and the operator may by rotating handle 82 turn the nut in either direction.

The ordinary automobile user has difficulty in understanding or remembering that it is necessary to keep the wrench 80 firm on the nut 42 in order to keep the dogs 54 and 56 unlocked. To overcome this the wrench is provided with any suitable sort of detachable latches which will temporarily connect it to the nut. The particular latch mechanism shown in the drawing consists of dogs 84 mounted on reciprocatable pins 86, spring pressed inward as shown in Figs. 4 and 5, and retractable by an outer handle member 88 turnable to two positions, in one of which the dogs engage the nut, as shown in the drawings, while in another position when the handles 88 engage and step up upon lugs or blocks 90 the members 84 clear the nut and the wrench can be withdrawn.

In the complete operation of the mechanism, assume the parts are disassembled. The operator first places the wheel on the hub 24 in approximately the position shown. He then takes the nut 42 and sets it in the wrench with the dogs 84 heretofore described, entering the recesses 92 in the nut. He then rotates the handle 82 to drive the nut 42 to the position shown in Fig. 1. He then takes hold of the handles 88 turns them as described, to release the wrench, and removes it from the nut. As this removal takes place, the spring 58 drives one of the dogs 54 and 56 to locked position of Fig. 1, and the wheel is in place. When it is desired to remove the wheel he simply reverses the operation described.

The construction by which the wheel proper is connected to the inner hub by having the wheel disk engage the pins 34 is important in that all of the strain of rotating the automobile is removed from the hub—i. e., the outer or wheel hub proper— thus doing away with the tendency to pull the wheel proper apart. This, therefore, permits the use of a light wheel which is very important where tire changes have to be made on the road. It also prevents bouncing which takes place where a heavy wheel is used.

Attention is called to the fact that the dog 54 or 56 being not pivoted on the nut, floats in opening 62 or 64 and opening 74 with reference to the nut, subject only to control by spring 58.

Having thus described my invention what I claim as new and desire to secure by Letters Patent, is:—

1. In mechanism of the class described, the combination of an inner hub screw threaded at its end, an outer hub fitting over but clearing the inner hub, a nut screw threaded on the inner hub and engaging the inner surface of the outer hub to clamp them together, a latch dog floating in a line at right angles to the axis of the hubs and nut to lock the nut to a hub, and a spring normally urging the dog to locked position.

2. In mechanism of the class described, the combination of an inner hub screw threaded at its end, an outer hub fitting over but clearing the inner hub, a nut screw threaded on the inner hub and engaging the inner surface of the outer hub to clamp them together, a latch dog floating in a line at right angles to the axis of the hubs and nut to lock the nut to a hub, and means detachably securing the latch dog in engagement with said hub.

3. In mechanism of the class described, the combination of an inner hub, an outer hub fitting over the inner hub, a nut movable into engagement with both hubs to secure them together, a latch dog floating in a line at right angles to the axis of the hubs and nut to lock the nut to a hub, and a spring normally urging the dog to locked position.

4. In mechanism of the class described, the combination of an inner hub, an outer hub fitting over the inner hub, a nut movable into engagement with both hubs to secure them together, a latch dog floating in a line at right angles to the axis of the hubs and nut to lock the nut to a hub, and means detachably securing the latch dog in engagement with said hub.

5. In mechanism of the class described, the combination of an inner hub screw threaded at its end, an outer hub fitting over but clearing the inner hub, a nut screw threaded on the inner hub and engaging the inner surface of the outer hub to clamp them together, a latch dog floating in a line at right angles to the axis of the hubs and nut to lock the nut to a hub, a spring normally urging the dog to locked position, and means engageable by a wrench placed upon said nut to automatically retract said latch dog from locked position.

6. In mechanism of the class described, the combination of an inner hub screw threaded at its end, an outer hub fitting over but clearing the inner hub, a nut screw threaded on the inner hub and engaging the inner surface of the outer hub to clamp them together, a latch dog floating in a line at right angles to the axis of the hubs and nut to lock the nut to a hub, means detachably securing the latch dog in engagement with said hub, and means engageable by a wrench placed upon said nut to automatically retract said latch dog from locked position.

7. In mechanism of the class described, the combination of an inner hub, an outer hub fitting over the inner hub, a nut movable into engagement with both hubs to secure them together, a latch dog floating in a line at right angles to the axis of the hubs and nut to lock the nut to a hub, a spring normally urging the dog to locked position, and means engageable by a wrench placed upon said nut to automatically retract said latch dog from locked position.

8. In mechanism of the class described, the combination of an inner hub, an outer hub fitting over the inner hub, a nut movable into engagement with both hubs to secure them together, a latch dog floating in a line at right angles to the axis of the hubs and nut to lock the nut to a hub, means detachably securing the latch dog in engagement with said hub, and means engageable by a wrench placed upon said nut to automatically retract said latch dog from locked position.

9. In mechanism of the class described, in combination with an inner hub outwardly flaring at its inner ends, an outer wheel hub fittable over said inner hub and at its inner end engaging the inclined surface of the inner hub, means at the inner end of said hubs for preventing rotation of one with reference to the other, a nut insertible inside the wheel hub into screw threaded engagement with the inner hub, the surface of contact between the nut and the wheel hub being inclined outwardly, and locking means for preventing rotation of the nut with reference to the outer hub, the same comprising a dog floating radially of the nut, spring means urging said dog outwardly of the nut and a roughened surface on the inside of the hub engageable by the dog for the purposes set forth.

10. In mechanism of the class described, a lock nut composed of a larger portion and a relatively smaller portion extending therefrom, the latter being of non-circular form adapted to be engaged by a wrench, a lock dog floating radially of the nut, having a portion inside the nut which extends through the slot in the circumference of the larger portion of the nut and a tail piece which extends through a perforation provided for it on the outside of the wrench engaging portion into a slot provided for its reception, and spring means normally urging the dog outward from the nut and the whole so arranged that placing a wrench on the wrench engaging portion of the nut in engagement with the tail piece of the dog will retract the dog against the action of said spring.

11. In mechanism of the class described, a nut, a wrench fitting on the nut, a reciprocatable latch member in the wrench capable of entering a recess in the nut to hold the wrench on the nut, means urging the latch into the nut, and means for selectively retaining the latch in position where it does not engage the nut.

12. In a demountable wheel construction having a hub composed of two separably cofitting parts, one within the other, the inner of said parts being adapted to engage a shaft concentrically, the said parts having means to resist the turning of one on the other of said parts, when assembled, and having a nut in threaded engagement with one of said parts and adapted to hold said parts together longitudinally, a locking device adapted to hold said nut in position where screwed to hold said parts together, said device consisting of a spring pressed dog floating with reference to said nut and positioned for such movement in substantially a radial plane containing the axis of said hub, and toothed means on the outer of said parts, adapted for locking engagement with said dog.

13. In a demountable wheel construction having a hub composed of two separably cofitting parts, one within the other, the inner of said parts being adapted to engage a shaft concentrically, the said parts having means to resist the turning of one on the other of said parts, when assembled, and having a nut in threaded engagement with one of said parts and adapted to hold said parts together longitudinally, a locking device adapted to hold said nut in position where screwed to hold said parts together, said device consisting of a spring pressed dog floating with reference to said nut and adapted for such movement in substantially a radial line passing at right angles through the axis of said hub, means upon said outer hub part adapted for locking engagement with said dog, said dog having a tail piece extending out above the outer surface of an extended portion of said nut, for depressing engagement with a wrench fitted to said nut to release the same.

14. In mechanism of the class described, an inner hub, a flange thereon, an outer hub fitting over the inner hub, a wheel disk extending outwardly from the outer hub, and a driving connection on the flange of the inner hub engaging the wheel construction outside the circumference of the outer hub.

15. In mechanism of the class described, an inner hub flanged at its inner end, an outer hub fitting over the inner hub, a wheel disk plate rigid on the outer hub and extending therefrom, a driving connection on the flange of the inner hub engaging the wheel disk at a point outside the outer hub, and means at the outer ends of the hubs for holding the parts in said position.

16. In mechanism of the class described, an inner hub flanged at its inner end, an outer hub fitting over the inner hub, a wheel disk plate rigid on the outer hub and extending therefrom, a pin on the flange of the inner hub entering a slot in the wheel disk at a point outside the outer hub, and means at the outer ends of the hubs for holding the parts in said position.

In witness whereof, I have hereunto subscribed my name in the presence of two witnesses.

JAMES A. CHARTER.

Witnesses:
 DWIGHT B. CHEEVER,
 A. ROSENTHAL.